2 Sheets--Sheet 1.

J. SCHMIDLAPP.
Improvement in Stering Apparatus for Hook
and Ladder Trucks.

No. 125,488.  Patented April 9, 1872.

Witnesses  
Charles L. Barrit  
R. Cowley

Inventor  
Jacob Schmidlapp

AM. PHOTO-LITHOGRAPHIC CO. N.Y. (OSBORNE'S PROCESS.)

J. SCHMIDLAPP.
Improvement in Stering Apparatus for Hook and Ladder Trucks.
No. 125,488.
Patented April 9, 1872.
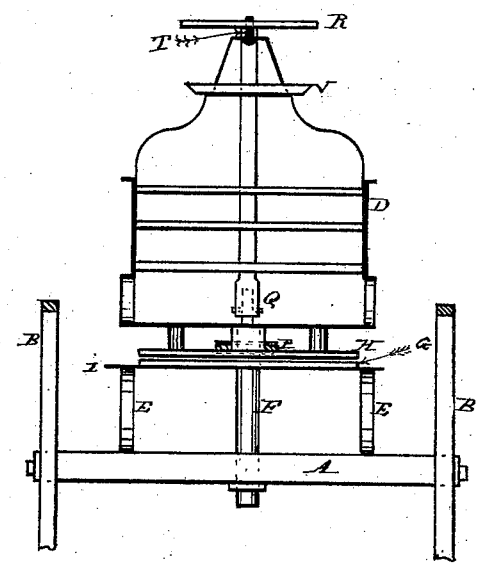
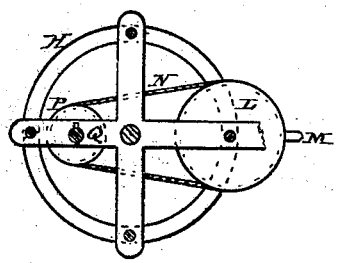 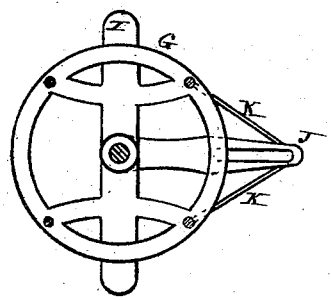
Witnesses
Charles L. Barritt
R. Rowley
Inventor
Jacob Schmidlapp 125,488

UNITED STATES PATENT OFFICE.

JACOB SCHMIDLAPP, OF NEW YORK, N. Y.

IMPROVEMENT IN STEERING APPARATUS FOR HOOK-AND-LADDER TRUCKS.

Specification forming part of Letters Patent No. 125,488, dated April 9, 1872.

SPECIFICATION.

*To all whom it may concern:*

Be it known that I, JACOB SCHMIDLAPP, of the city, county, and State of New York, have invented certain new and useful Improvements in Steering Apparatus for Hook-and-Ladder Trucks; and I do hereby declare that the following is a full description of the same:

The nature of my invention consists, first, in combining with the front side of the rear axle of the truck and under side of the lower circle-plate, solidly secured thereon, a slotted steering-lever of such suitable length as to give an easy and commanding leverage over the rear wheels, by means of pulley-wheels secured to the upper circle-plate attached to the truck body and steering-wheel, to enable the pilot to change the direction of the truck with great rapidity and at the same time with very little labor. Also, in combining with the upper circle-plate, solidly secured to the body of the truck, a steering pulley-wheel, having a steering-pin in its periphery, to work in the slot of the steering-lever, and a propelling-pulley on the end of the steering-wheel spindle, whereby, by means of an endless-chain belt connecting the two pulleys together, they may rotate the steering pulley-wheel to vibrate the steering-lever and change the direction of the wheels to steer the truck. Also, in constructing the steering-wheel with an inner rim perforated with a series of detents or holes therein, to enable the pilot to lock the wheels by means of a steadying-pin, secured to the saddle or pilot's seat, engaging into the detent holes, and thus hold the wheels firmly and steadily and the truck firmly on its course. Also, in constructing the pilot's seat with a saddle or leg-supporter, extending from the seat to the steering-spindle frame, so as to enable the pilot to straddle the seat and thus prevent his being jolted or thrown from it while the truck is in motion, and at the same time giving him a secure and steady command of the steering-wheel to guide the truck.

But to describe my invention more particularly, I will refer to the accompanying drawing forming a part of this specification, the same letters of reference, wherever they occur, referring to like parts.

Figure 1:
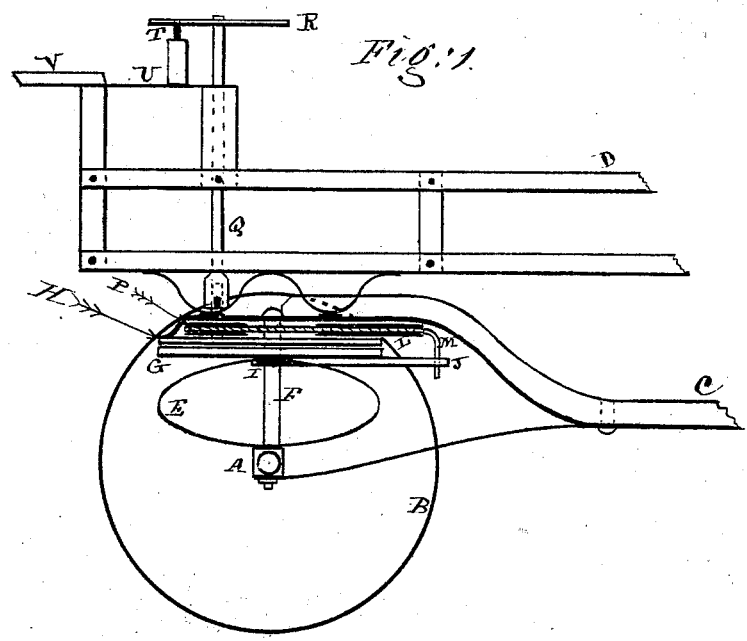
Figure 2:
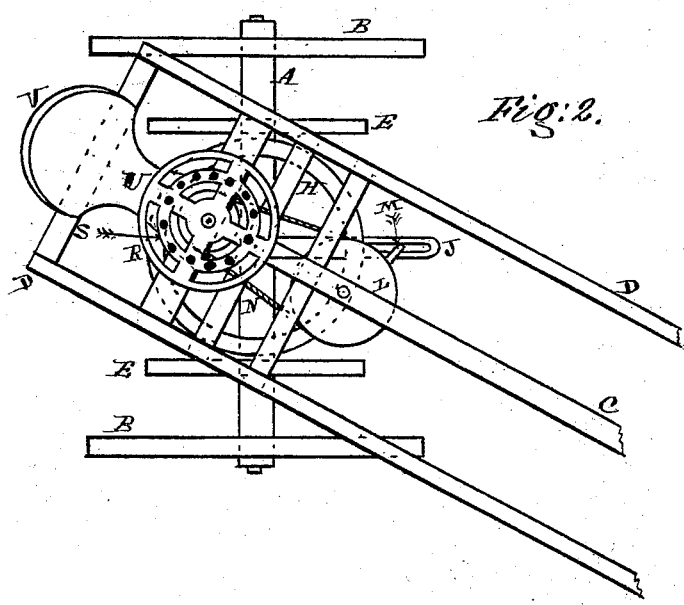

Sheet 1, Figure 1, is a side elevation of the rear wheels of the truck and steering apparatus. Sheet 1, Fig. 2, is a plan view of the same, showing the wheels turned to one side to expose the steering-lever and position of the wheels when turning a corner. Sheet 2, Fig. 3, is a vertical end view of the truck. Sheet 2, Fig. 4, is a detached view of the upper circle-plate and steering-pulley, showing its connection with the propelling-pulley by means of the endless chain. Sheet 2, Fig. 5, is a detached view of the lower circle-plate and slotted steering-lever attached thereto.

Letters A and B represent the axle and wheels of the truck, and C the reach or perch, and D the truck-body, and E the springs for supporting the body of the same. As these parts do not constitute the essence of my invention, and are only necessary as showing its connection therewith, it is not deemed important to give any lengthened description of their construction. Letter F is the king-bolt, having its lower end working in a hole in the axle. On its upper end is secured the circle-plates G and H. The lower one G is solidly attached to the axle by being riveted upon a cross-bar, I, connecting the upper sides of the two elliptic springs E together. As these springs, at their lower sides, are bolted to the axle, it will thus be seen that the circle-plate G when it turns will carry with it the wheels to change their direction. To accomplish this object a slotted steering-lever, J, is secured to the front side of the circle-plate by suitable rivets and braces of metal K, so as to give it the requisite strength to endure any strain required to steer the wheels. The length of this steering-lever is about twelve inches, but may be made longer, if desired, to obtain greater leverage and a quicker motion in steering the wheels. This is effected by means of a steering pulley-wheel, L, in the periphery of which a guide-pin, M, is secured, of such a shape as to enter the slot in the steering-lever J and thus, as the wheel L is rotated by means of an endless chain-belt, N, connecting it with a propelling pulley-wheel, P, on the lower end of the steering-wheel spindle Q, the pin traverses the slot in the lever J to vibrate the axle and wheels of the truck to steer it in any required direction. The steering pulley-wheel L and propelling-pulley P are secured by center pins on the upper circle-plate H, which is attached to the body of the truck and held in place on the lower circle-plate G by the king-bolt passing through the reach or perch. By this arrangement of the upper and lower circle-plates, with the steering-lever secured to the lowermost one attached to the axle and wheels thereon, and the steering and propelling pulleys secured to the uppermost one attached to the body of the truck, it will be seen that by turning the steering-wheel R either to the right or left will readily and easily sheer the wheels to change the direction of the truck, and at the same time perform the operation with great quickness because of the length of the steering-lever beyond the circumference of the circle-plates. For the purpose of holding the wheels of the truck steady and at the same time relieving the great strain on the pilot in keeping the wheels on a given course, when in motion, a perforated inner rim, S, is added to the steering-wheel R, and a detent pin, T, secured to the upper side of the saddle U of the pilot's seat V, directly under the perforated rim, so that at any given point, by depressing the perforated rim upon the detent pin, the wheels will be kept steady in their course. This detent pin may be adjusted upon a spiral or other spring to enter the perforations in the rim, or thrown up by a foot lever. As a general rule there is always a sufficient amount of spring in the steering-wheel and spindle to admit of depressing the wheel sufficient to engage on the detent pin to hold it steady, especially as the pilot has to exert at all times a certain amount of force to operate the wheel. To enable the pilot to exert the requisite amount of force to steer the truck, and at the same time maintain a firm control over it and prevent being thrown overboard by the lurching motions of the truck and elevated position, a leg-supporter or saddle, U, is projected from the pilot's seat V to the cross-bar of the truck-frame, through which the steering-wheel spindle passes and is supported. By this means the pilot straddles the saddle and thus keeps him steady and firmly seated, however much the body of the truck may lurch. In the absence of the saddle the pilot has to exert the greatest amount of care to keep himself well braced by his feet resting upon the opposite upper rails of the truck-body. As this is not possible at all times, serious accidents have been the consequence. With the legs of the pilot at each side of the saddle this could not happen, and he could only be displaced from his seat by a capsize of the truck.

Having now described my invention, I will proceed to set forth what I claim and desire to secure by Letters Patent of the United States—

1. I claim the slotted steering-lever J, in combination with the lower circle-plate G and axle of a hook-and-ladder truck, substantially as described.

2. I also claim, in combination with the slotted steering-lever J, the steering pulley-wheel L, guide-pin M, chain N, propelling-pulley P, and upper circle-plate H, substantially as described, and for the purposes set forth.

3. I also claim the steering-wheel R, when made with an inner perforated rim, S, or equivalent device, in combination with the detent T, arranged and operating substantially as described.

4. I also claim the leg-supporter or saddle U, in combination with the pilot's seat V and steering-wheel R, as described, and for the purposes set forth.

JACOB SCHMIDLAPP.

Witnesses:
CHARLES L. BARRITT,
R. ROWLEY.